(12) United States Patent
Yang et al.

(10) Patent No.: US 12,064,841 B2
(45) Date of Patent: Aug. 20, 2024

(54) DEVICE FOR INSTALLING RETAINING RING ON SHAFT

(71) Applicant: HENGDIAN GROUP INNUOVO ELECTRIC CO., LTD., Dongyang (CN)

(72) Inventors: Yongtao Yang, Dongyang (CN); Guanjun Jin, Dongyang (CN)

(73) Assignee: HENGDIAN GROUP INNUOVO ELECTRIC CO., LTD., Dongyang (CN)

( * ) Notice: Subject to any disclaimer, the term of this patent is extended or adjusted under 35 U.S.C. 154(b) by 496 days.

(21) Appl. No.: 17/601,044

(22) PCT Filed: Apr. 27, 2020

(86) PCT No.: PCT/CN2020/087197
§ 371 (c)(1),
(2) Date: Oct. 1, 2021

(87) PCT Pub. No.: WO2021/135002
PCT Pub. Date: Jul. 8, 2021

(65) Prior Publication Data
US 2022/0168857 A1    Jun. 2, 2022

(30) Foreign Application Priority Data
Dec. 30, 2019 (CN) .......................... 201911392853.3

(51) Int. Cl.
*B23P 19/00* (2006.01)
*B23P 19/08* (2006.01)

(52) U.S. Cl.
CPC ........... *B23P 19/084* (2013.01); *B23P 19/002* (2013.01)

(58) Field of Classification Search
CPC ....... B25B 27/023; B25B 27/00; B25B 11/00; B25B 11/02; B23P 19/00; B23P 19/02; B23P 19/10
See application file for complete search history.

(56) References Cited

U.S. PATENT DOCUMENTS

| | | | | |
|---|---|---|---|---|
| 575,687 | A * | 1/1897 | Brockett | ................. B25B 1/125 269/182 |
| 4,689,865 | A * | 9/1987 | Chamblee | ............. B25B 27/205 29/229 |

(Continued)

FOREIGN PATENT DOCUMENTS

| | | |
|---|---|---|
| CN | 205057455 | 3/2016 |
| CN | 106975907 | 7/2017 |

(Continued)

*Primary Examiner* — Lee D Wilson
(74) *Attorney, Agent, or Firm* — Jiwen Chen; Joywin IP Law PLLC

(57) ABSTRACT

An object of the present invention is to provide a device for installing a retaining ring on a shaft which can reduce the labor intensity of workers. The device for installing a retaining ring on a shaft comprises an expansion assembly. The expansion assembly includes a shell. A push block is movably fixed in the shell. Two expansion members that are symmetrical left and right are arranged in front of the push block. The expansion members include expansion portions that are located outside the shell and extend outward. Rear ends of the expansion portions are expansion portion first sections. The expansion members comprise a left expansion member on the left side and a right expansion member on the right side. The left end face of the expansion portion first section of the left expansion member is a slope extending leftward from rear to front. The push plate moves in a front-rear direction so that the expansion portions of the two expansion members move left and right, respectively. A loading rod is fixed on the lower side of the shell. A front (Continued)

edge of a front portion of the loading rod extends outward in a circumferential direction to form a limiting bump. A compression spring is sheathed on a rear portion of the loading rod. A front end face of the loading rod is recessed inward to form an evading groove.

12 Claims, 4 Drawing Sheets

(56) References Cited

U.S. PATENT DOCUMENTS

| | | | |
|---|---|---|---|
| 8,256,753 B2* | 9/2012 | Teo | B25B 1/2484 |
| | | | 269/280 |
| 2022/0168857 A1* | 6/2022 | Yang | B23P 19/001 |

FOREIGN PATENT DOCUMENTS

| | | |
|---|---|---|
| CN | 206764274 | 12/2017 |
| CN | 110052823 | 7/2019 |

* cited by examiner

DEVICE FOR INSTALLING RETAINING RING ON SHAFT

This is a U.S. national stage application of PCT Application No. PCT/CN2020/087197 under 35 U.S.C. 371, filed Apr. 27, 2020 in Chinese, claiming priority of Chinese Application No. 201911392853.3, filed Dec. 30, 2019, all of which is hereby incorporated by reference.

TECHNICAL FIELD OF THE INVENTION

The present invention relates to a device for installing a retaining ring on a shaft.

BACKGROUND OF THE INVENTION

In the prior art, a worker often expands the stop dog by nipper pliers or retainer pliers (circlip pliers) in order to sheath a retaining ring on the workpiece shaft. After the retaining ring is moved into the annular groove on the workpiece shaft, the worker cancels the force applied to the nipper pliers, so that the retaining ring is reset and clamped into the annular groove on the workpiece shaft. However, it is troublesome and strenuous to use the nipper pliers or retainer pliers, and the nipper pliers need to be held all the time. As a result, the labor intensity of workers is high.

SUMMARY OF THE INVENTION

An object of the present invention is to provide a device for installing a retaining ring on a shaft which can reduce the labor intensity of workers.

To achieve the above object, the present invention employs the following technical solutions. A device for installing a retaining ring on a shaft is provided, comprising an expansion assembly, wherein the expansion assembly comprises a shell; an inner cavity is formed in the shell; a push block is movably fixed in the shell; two expansion members that are symmetrical left and right are arranged in front of the push block; the expansion members comprise expansion portions that are located outside the shell and extend outward; rear ends of the expansion portions are expansion portion first sections; the expansion members comprise a left expansion member on the left side and a right expansion member on the right side; the left end face of the expansion portion first section of the left expansion member is a slope extending leftward from rear to front, and the right end face of the expansion portion first section of the right expansion member is a slope extending rightward from rear to front; the push plate moves in a front-rear direction so that the expansion portions of the two expansion members move left and right, respectively; a loading rod is fixed on the lower side of the shell; a front edge of a front portion of the loading rod extends outward in a circumferential direction to form a limiting bump; a compression spring is sheathed on a rear portion of the loading rod; and, a front end face of the loading rod is recessed inward to form an evading groove.

Before the use of the device of the present invention, a plurality of retaining rings are sheathed on a loading shaft, so that the plurality of retaining rings are limited between the compression spring and the limiting bump, and the expansion portions of the expansion members are inserted into holes on the front-most retaining ring. Subsequently, the worker manually or automatically inserts an end portion (a portion having an annular groove for fixing the retaining ring) of the workpiece shaft into the evading groove on the loading rod, and the annular groove on the workpiece shaft is located near the limiting bump. Then, the push block is pushed to move forward, so that the front-most retaining ring is expanded by the expansion members, and the outer diameter of the front-most retaining ring becomes larger. Due to the compression spring, the retaining ring is pushed to move forward to pass through the limiting bump and separate from the loading rod so as to be located on the workpiece shaft. At this time, the compression spring will not apply any force to the front-most retaining ring. The push block and the expansion members are then reset, and the retaining ring is contracted due to its own elasticity, moved backward along the slopes of the expansion portion first sections and installed on the workpiece shaft. Finally, the workpiece shaft can be pulled out. If the retaining ring is not located in the annular groove on the workpiece shaft, the worker can manually push the retaining ring into the annular groove on the workpiece shaft.

Preferably, a first guide groove that runs through inner and outer sides of the shell and is arranged in a left-right direction is formed in a front portion of the shell; each of the expansion members consists of a movable portion arranged in the front-rear direction, a guide portion arranged in an up-down direction and the expansion portion arranged in the front-rear direction; a rear end of the movable portion is rotatably fixed to the push block, while a front end thereof is connected to the guide portion; and, the guide portion extends into the first guide groove, and one end of the guide portion passes through the first guide groove to extend to the outside of the shell so as to be fixed to the expansion portion. The above arrangement is used to realize the left and right swing of the expansion members, so that the retaining ring can be deformed and expanded.

Preferably, the expansion portions comprise expansion portion first sections and expansion portion second sections successively from rear to front; the rear end of the left end face of the expansion portion second section of the left expansion member is connected to the front end of the left end face of the expansion portion first section; the rear end of the right end face of the expansion portion second section of the right expansion member is connected to the front end of the right end face of the expansion portion first section; and, the left end face of the expansion portion second section of the left expansion member is parallel to the right end face of the expansion portion second section of the right expansion member. The expansion portion second sections are used to stably expand the retaining ring when the expansion members swing left and right.

Preferably, outer edges of the cross-sections of the expansion portion second sections are circular, and the expansion portion second sections have the same outer diameter in the front-rear direction; and, outer edges of the cross-sections of the expansion portion first sections are circular, and the expansion portion first sections have an outer diameter gradually decreasing from rear to front so that the expansion portion first sections are tapered into a cone shape.

Preferably, a guide strip that extends upward and is arranged in the front-rear direction is provided on an upper edge of the loading rod. The guide strip is provided to limit the rotation of the retaining ring, so that the holes on the retaining ring can be aligned with the expansion portions of the expansion members.

Preferably, the shell includes an upper plate and a lower plate; the first guide groove and a second guide groove are formed on upper and lower opposite sides of the shell, respectively; ends of the guide portions away from the expansion portions are located in the second guide groove; and, the second guide groove is arranged in the left-right direction. With the above arrangement, the guiding and limiting of the expansion members are realized.

Preferably, a limiting column arranged in the up-down direction is provided on the push block, a third guide groove arranged in the front-rear direction is formed on the shell, and the limiting column is located in the third guide groove. With the above arrangement, the guiding and limiting of the push block are realized.

Preferably, first guide holes arranged in the front-rear direction are formed on the push block, with guide columns being arranged in the first guide hole, the guide columns being fixed to guide blocks, the guide blocks being fixed to the shell, limiting blocks being fixed on sides of the guide columns away from the guide blocks, and the push block being located between the limiting blocks and the guide blocks; or, a guide column arranged in the front-rear direction is fixed on the push block, with the guide column passing through a second guide hole on the guide block, a limiting block being fixed at an end of the guide column away from the push block, and the guide block being located between the push block and the limiting block. With the above arrangement, the guiding and limiting of the push block are realized.

Preferably, the push block is fixed at an output end of a linear driving mechanism. The linear driving mechanism may be a motor, an air cylinder, an electric cylinder, an electric push rod and other various existing devices available in the market. Since the push block is pushed by the linear driving mechanism, it is convenient for the automation of the present invention, and the labor intensity of workers is further reduced.

Preferably, the limiting bump has an annular cross-section, and the outer diameter of the limiting bump is greater than that of the loading rod.

In accordance with the present invention, it is convenient to use, and the labor intensity of workers can be reduced.

DETAILED DESCRIPTION OF THE INVENTION

The present invention will be further described below by specific embodiments with reference to the accompanying drawings.

Figure 1:
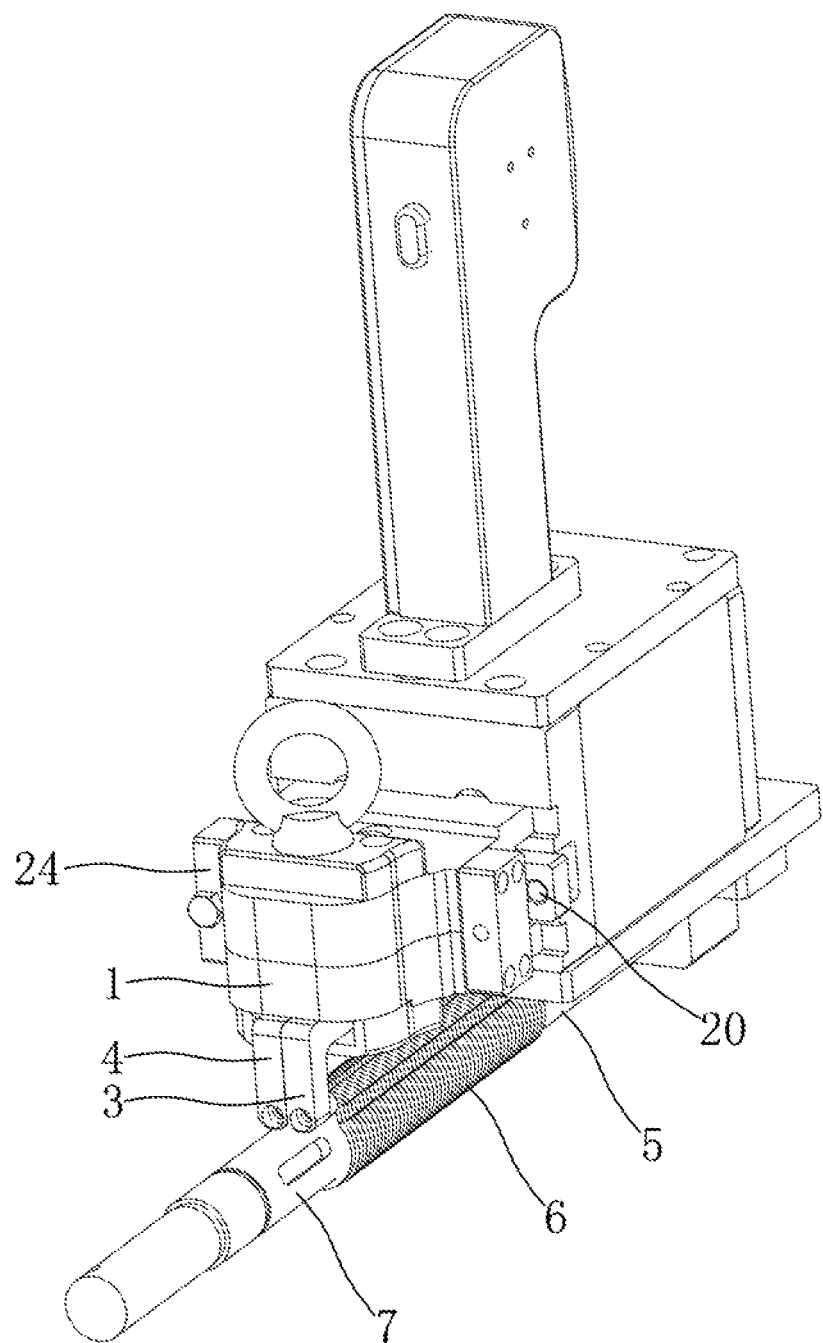
FIG. 1 is a schematic structure diagram of the device of the present invention when it is fitted with a workpiece shaft.
Figure 2:
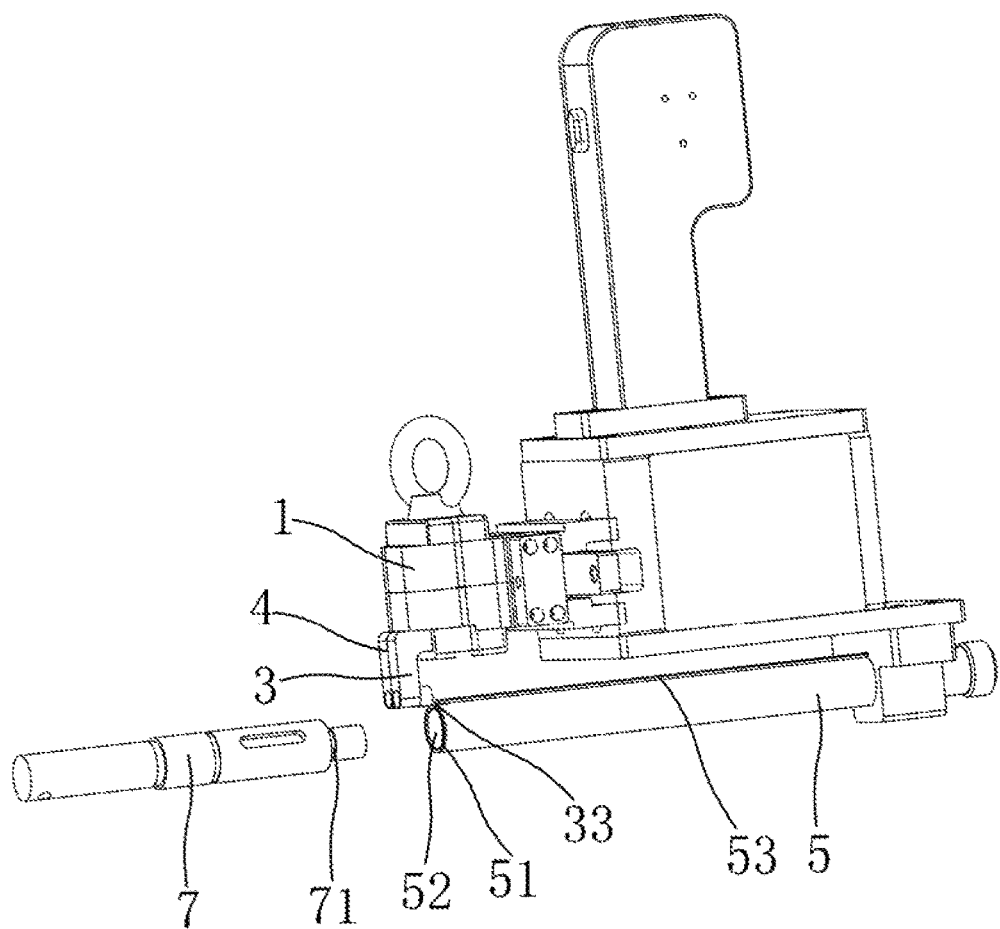
FIG. 2 is a schematic structure diagram of the device of the present invention when it is not fitted with a workpiece shaft.
Figure 3:
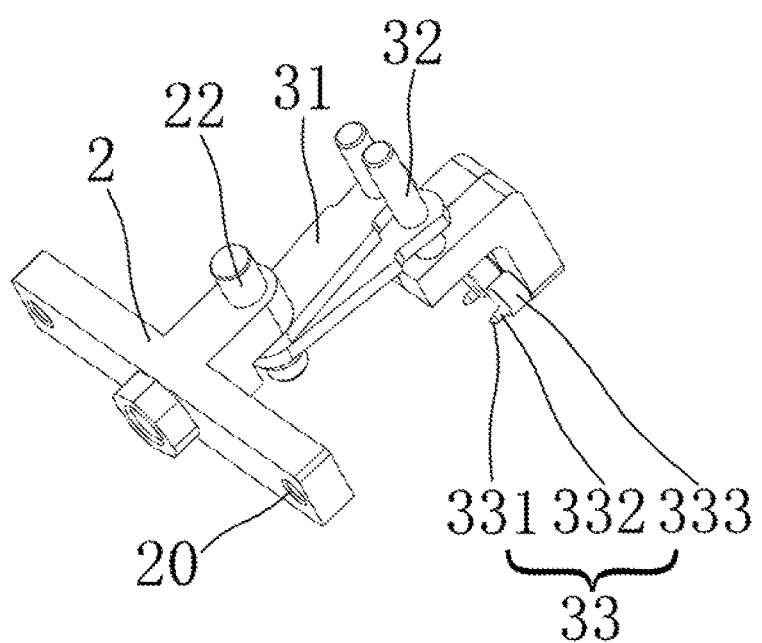
FIG. 3 is a schematic structure diagram of an expansion member according to the present invention.
Figure 4:
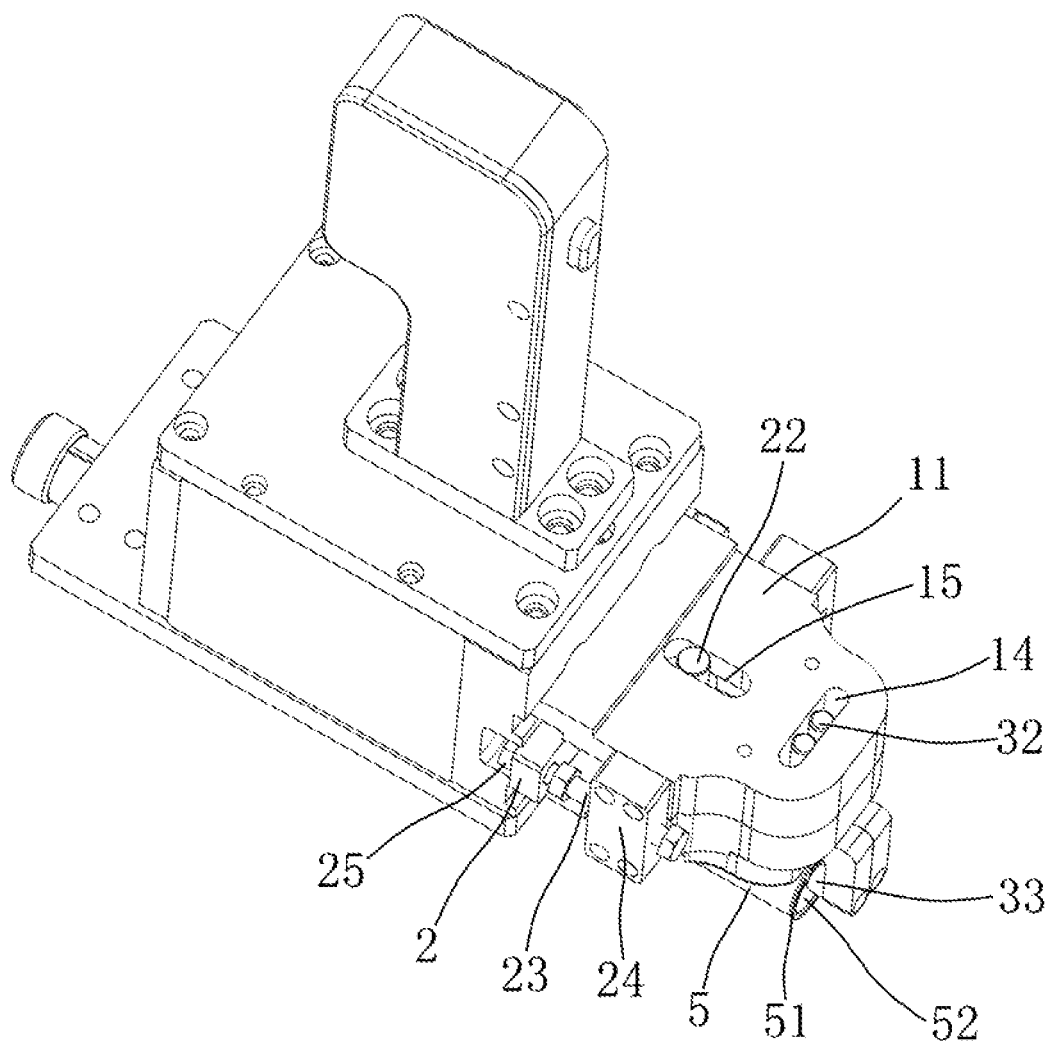
FIG. 4 is a schematic structure diagram of a shell according to the present invention.
Figure 5:
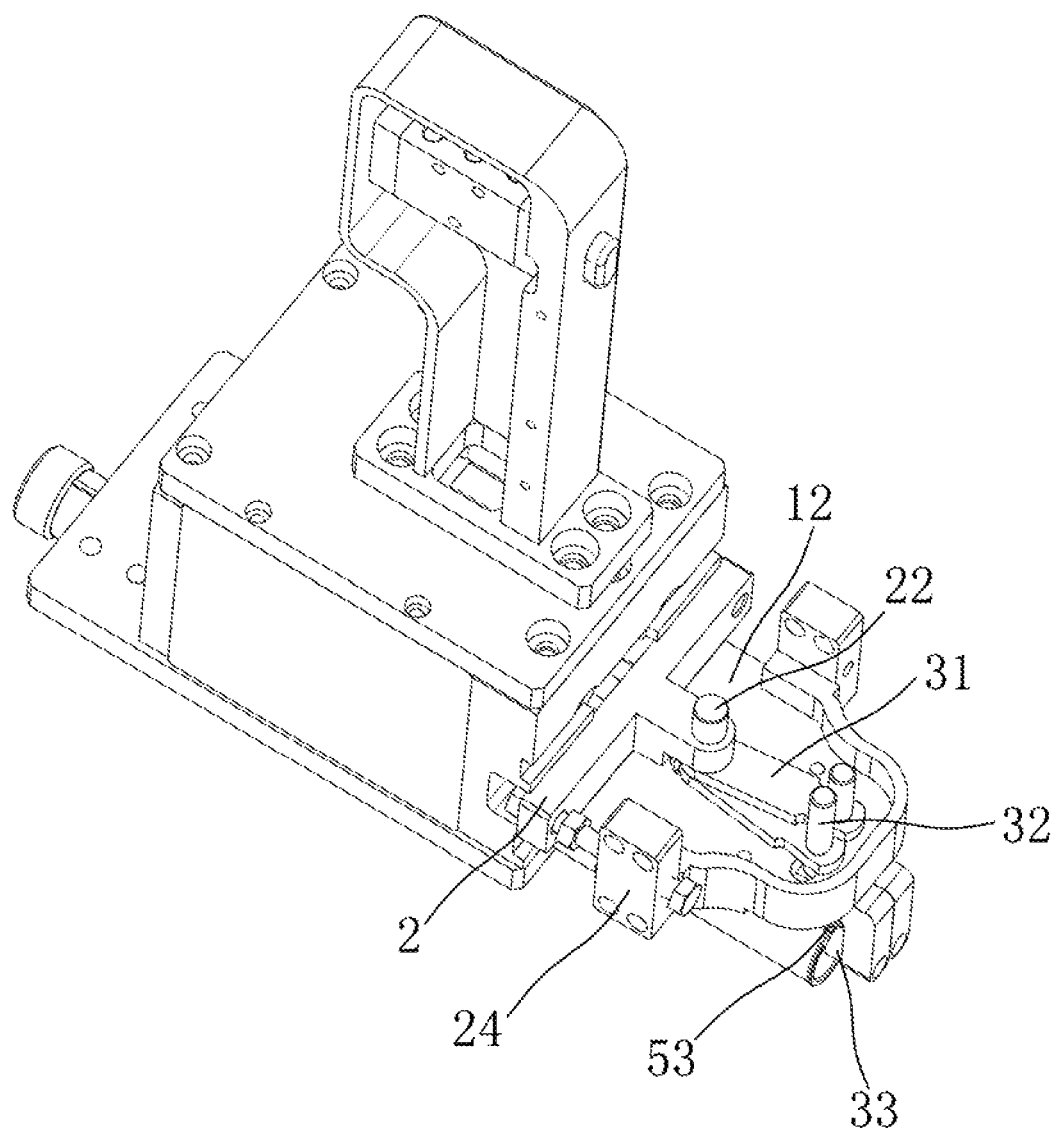
FIG. 5 is another schematic structure diagram of the shell according to the present invention.

As shown in FIGS. 1 to 5, the present invention provides a device for installing a retaining ring on a shaft, comprising an expansion assembly. The expansion assembly comprises a shell 1. An inner cavity is formed in the shell 1. A push block 2 is movably fixed in the shell 1. Two expansion members that are symmetrical left and right are arranged in front of the push block 2. The expansion members consist of movable portions 31 arranged in a front-rear direction, guide portions 32 arranged in an up-down direction, and expansion portions 33 arranged in the front-rear direction and located outside the shell. The shell 1 comprises an upper plate 11 and a lower plate 12. A first guide groove 13 that runs through inner and outer sides of the lower plate and is arranged in a left-right direction is formed in a front portion of the lower plate 12. Rear ends of the movable portions 31 are rotatably fixed to the push block 2, while front ends thereof are connected to the guide portions 32. The guide portions 32 extend downward into the first guide groove, and lower ends of the guide portions 32 passes through the first guide groove 13 to extend to the outside of the shell so as to be fixed to the expansion portions 33. The expansion members comprise a left expansion member 3 and a right expansion member 4. The push block 2 is fixed on an output shaft of a linear driving mechanism. Under the action of the linear driving mechanism, the push block 2 moves forward so that the left expansion member 3 swings left and the right expansion member 4 swings right.

The expansion portions 33 include expansion portion first sections 331, expansion portion second sections 332 and expansion portion third sections 333 successively from rear to front. The rear end face of the expansion portion first section of the left expansion member 3 is a slope extending leftward from rear to front, and the right end face of the expansion portion first section of the right expansion member 4 is a slope extending rightward from rear to front. The rear end of the left end face of the expansion portion second section of the left expansion member 3 is connected to the front end of the left end face of the expansion portion first section, the rear end of the right end face of the expansion portion second section of the right expansion member 4 is connected to the front end of the right end face of the expansion portion first section, and the left end face of the expansion portion second section of the left expansion member 3 is parallel to the right end face of the expansion portion second section of the right expansion member 4. Outer edges of the cross-sections of the expansion portion second sections 332 are circular, and the expansion portion second sections 332 have the same outer diameter in the front-rear direction. Outer edges of the cross-sections of the expansion portion first sections 331 are circular, and the expansion portion first sections 331 have an outer diameter gradually decreasing from rear to front so that the expansion portion first sections 331 are tapered into a cone shape. Outer circumferential edges of the expansion portion third sections 333 are located on outer sides of outer circumferential edges of the expansion portion second sections 332, so that the expansion portion third sections and the expansion portion second sections form step structures.

A loading rod 5 is fixed on the lower side of the shell 1. A front end of a front portion of the loading rod 5 extends outward in a circumferential direction to form a limiting bump 51. A compression spring (not shown) is sheathed on a rear portion of the loading rod 5. A front end face of the loading rod 5 is recessed inward to form an evading groove 52. A guide strip 53 that extends upward and is arranged in the front-rear direction is provided on an upper edge of the loading rod 5. The limiting bump 51 has an annular cross-section, and the outer diameter of the limiting bump 51 is greater than that of the loading rod 5.

A second guide groove 14 corresponding to the first guide groove 13 is formed in the front portion of the upper plate 11 of the shell. The second guide groove runs through inner and outer sides of the upper plate 11 and is arranged in the left-right direction. Upper ends of the guide portions 32 of the expansion members are located in the second guide groove 14. Circular holes running through upper and lower sides are formed at the rear end of the movable portion of the left expansion member 3 and at the rear end of the movable portion of the right expansion member. A limiting column 22 arranged in the up-down direction is fixed at the front end of the push block 2, a third guide groove 15 arranged in the front-rear direction is formed on the upper plate 11 of the shell, and the upper end of the limiting column 22 is located in the third guide groove 15. The movable portions are sheathed on the limiting column 12, the front end of the movable portion of the left expansion member 3 is located on the left side of the rear end of the movable portion, and the front end of the movable portion of the right expansion member 4 is located on the right side of the rear end of the movable portion.

Left and right ends of the push rod 2 extend to the outside of the shell 1. First guide holes 20 arranged in the front-rear direction are formed at left and right ends of the push block 2. Guide columns 23 are arranged in the first guide holes. The guide columns 23 are fixed to guide blocks 24, and the guide columns 23 have external threads formed in their front portions and pass through the guide blocks 24. The guide blocks 24 are fixed to the shell 1. The threads in the front portions of the guide columns 23 are fitted with two fixed threads to realize the fixation of the guide columns 23 to the guide blocks 24. Limiting blocks 25 are fixed at rear ends of the guide columns 23, and the limiting blocks 25 are fixed to the rear ends of the column columns by threads or glue. The push block 2 is located between the limiting blocks 25 and the guide blocks 24.

Before the use of the device of the present invention, a plurality of retaining rings 6 are sheathed on a loading shaft 5, so that the plurality of retaining rings are limited between the compression spring and the limiting bump 51, and the expansion portions 33 of the expansion members are inserted into the holes on the front-most retaining ring. Subsequently, the worker manually or automatically inserts an end portion (a portion having an annular groove for fixing the retaining ring) of the workpiece shaft 7 into the evading groove 52 on the loading rod 5, and the annular groove 71 on the workpiece shaft 7 is located near the limiting bump 51. Then, the push block 2 is pushed to move forward by the linear driving mechanism, so that the front-most retaining ring is expanded by the expansion members, and the outer diameter of the front-most retaining ring becomes larger. Due to the compression spring, the retaining ring is pushed to move forward to pass through the limiting bump 51 and separate from the loading rod 5 so as to be located on the workpiece shaft 7. At this time, the compression spring will not apply any force to the front-most retaining ring. The push block 2 and the expansion members are then reset, and the retaining ring is contracted due to its own elasticity, moved backward along the slopes of the expansion portion first sections 331 and installed on the workpiece shaft 7. Finally, the workpiece shaft 7 is pulled out, so that the operation of installing a retaining ring on a shaft is completed.

In accordance with the present invention, it is convenient to use, and the labor intensity of workers can be reduced.

The invention claimed is:

1. A device for installing a retaining ring on a shaft, comprising an expansion assembly, wherein the expansion assembly comprises a shell; an inner cavity is formed in the shell; a push block is movably fixed in the shell; two expansion members that are symmetrical left and right are arranged in front of the push block; the expansion members comprise expansion portions that are located outside the shell and extend outward; rear ends of the expansion portions are expansion portion first sections; the expansion members comprise a left expansion member on the left side and a right expansion member on the right side; the left end face of the expansion portion first section of the left expansion member is a slope extending leftward from rear to front, and the right end face of the expansion portion first section of the right expansion member is a slope extending rightward from rear to front; the push plate moves in a front-rear direction so that the expansion portions of the two expansion members move left and right, respectively; a loading rod is fixed on the lower side of the shell; a front edge of a front portion of the loading rod extends outward in a circumferential direction to form a limiting bump; a compression spring is sheathed on a rear portion of the loading rod; and, a front end face of the loading rod is recessed inward to form an evading groove.

2. The device for installing a retaining ring on a shaft according to claim 1, wherein a first guide groove that runs through inner and outer sides of the shell and is arranged in a left-right direction is formed in a front portion of the shell; each of the expansion members consists of a movable portion arranged in the front-rear direction, a guide portion arranged in an up-down direction and the expansion portion arranged in the front-rear direction; a rear end of the movable portion is rotatably fixed to the push block, while a front end thereof is connected to the guide portion; and, the guide portion extends into the first guide groove, and one end of the guide portion passes through the first guide groove to extend to the outside of the shell so as to be fixed to the expansion portion.

3. The device for installing a retaining ring on a shaft according to claim 1, wherein the expansion portions comprise expansion portion first sections and expansion portion second sections successively from rear to front; the rear end of the left end face of the expansion portion second section of the left expansion member is connected to the front end of the left end face of the expansion portion first section; the rear end of the right end face of the expansion portion second section of the right expansion member is connected to the front end of the right end face of the expansion portion first section; and, the left end face of the expansion portion second section of the left expansion member is parallel to the right end face of the expansion portion second section of the right expansion member.

4. The device for installing a retaining ring on a shaft according to claim 3, wherein outer edges of the cross-sections of the expansion portion second sections are circular, and the expansion portion second sections have the same outer diameter in the front-rear direction; and, outer edges of the cross-sections of the expansion portion first sections are circular, and the expansion portion first sections have an outer diameter gradually decreasing from rear to front so that the expansion portion first sections are tapered into a cone shape.

5. The device for installing a retaining ring on a shaft according to claim 1, wherein a guide strip that extends upward and is arranged in the front-rear direction is provided on an upper edge of the loading rod.

6. The device for installing a retaining ring on a shaft according to claim 2, wherein the shell comprises an upper plate and a lower plate; the first guide groove and a second guide groove are formed on upper and lower opposite sides of the shell, respectively; ends of the guide portions away from the expansion portions are located in the second guide groove; and, the second guide groove is arranged in the left-right direction.

7. The device for installing a retaining ring on a shaft according to claim 1, wherein a limiting column arranged in the up-down direction is provided on the push block, a third guide groove arranged in the front-rear direction is formed on the shell, and the limiting column is located in the third guide groove.

8. The device for installing a retaining ring on a shaft according to claim 1, wherein first guide holes arranged in the front-rear direction are formed on the push block, with guide columns being arranged in the first guide hole, the guide columns being fixed to guide blocks, the guide blocks being fixed to the shell, limiting blocks being fixed on sides of the guide columns away from the guide blocks, and the push block being located between the limiting blocks and the guide blocks; or, a guide column arranged in the front-rear direction is fixed on the push block, with the guide column passing through a second guide hole on a guide block, a limiting block being fixed at an end of the guide column away from the push block, and the guide block being located between the push block and the limiting block.

9. The device for installing a retaining ring on a shaft according to claim 1, wherein the push block is fixed at an output end of a linear driving mechanism.

10. The device for installing a retaining ring on a shaft according to claim 1, wherein the limiting bump has an annular cross-section, and the outer diameter of the limiting bump is greater than that of the loading rod.

11. The device for installing a retaining ring on a shaft according to claim 2, wherein a limiting column arranged in the up-down direction is provided on the push block, a third guide groove arranged in the front-rear direction is formed on the shell, and the limiting column is located in the third guide groove.

12. The device for installing a retaining ring on a shaft according to claim 2, wherein first guide holes arranged in the front-rear direction are formed on the push block, with guide columns being arranged in the first guide hole, the guide columns being fixed to guide blocks, the guide blocks being fixed to the shell, limiting blocks being fixed on sides of the guide columns away from the guide blocks, and the push block being located between the limiting blocks and the guide blocks; or, a guide column arranged in the front-rear direction is fixed on the push block, with the guide column passing through a second guide hole on a guide block, a limiting block being fixed at an end of the guide column away from the push block, and the guide block being located between the push block and the limiting block.

\* \* \* \* \*